(12) United States Patent  
Glovinsky

(10) Patent No.: US 7,960,950 B2
(45) Date of Patent: Jun. 14, 2011

(54) ZERO CURRENT SWITCHING

(75) Inventor: Tzachi Glovinsky, Petah Tikva (IL)

(73) Assignee: Solaredge Technologies Ltd., Herzelia (IL)

( * ) Notice: Subject to any disclaimer, the term of this patent is extended or adjusted under 35 U.S.C. 154(b) by 144 days.

(21) Appl. No.: 12/409,763

(22) Filed: Mar. 24, 2009

(65) Prior Publication Data

US 2009/0237043 A1   Sep. 24, 2009

Related U.S. Application Data

(60) Provisional application No. 61/039,046, filed on Mar. 24, 2008.

(51) Int. Cl.
*G05F 1/613* (2006.01)
*G05F 1/10* (2006.01)
(52) U.S. Cl. .................. 323/224; 323/235; 323/290
(58) Field of Classification Search .................. 323/224, 323/235, 290
See application file for complete search history.

(56) References Cited

U.S. PATENT DOCUMENTS 7,782,031 B2 *   8/2010   Qiu et al. ................... 323/272

FOREIGN PATENT DOCUMENTS

WO   PCT/IB2009/051221   3/2009

OTHER PUBLICATIONS

Baggio J E: "Quasi-ZVS active auxiliary commutation circuit for two switches forward converter" 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.
Ilic M: "Interleaved Zero-Current-Transition Buck Converter" IEEE Transactions on Industry Applications, IEEE Service Center, Piscataway, NJ, US, vol. 43, No. 6, Nov. 1, 2007, pp. 1619-1627, XP011197477 ISSN: 0093-9994 pp. 1619-1622.
Dong Ho Lee: "Novel zero-voltage-transition and zero-current-transition pulse-width-modulation converters" Power Electronics Specialists Conference, 1997. PESC '97 Record., 28th Annual IEEE St. Louis, MO, USA Jun. 22-27, 1997, New York, NY, USA IEEE, US, vol. 1, Jun. 22, 1997, pp. 233-239, XP010241553 ISBN: 978-0-7803-3840-1 p. 233-p. 236.
Internation Search Report and Opinion of International Patent application PCT/2009/051221, Oct. 19, 2009.

* cited by examiner

*Primary Examiner* — Shawn Riley
(74) *Attorney, Agent, or Firm* — The Law Office of Michael E. Kondoudis

(57) ABSTRACT

A method for providing non-resonant zero-current switching in a switching power converter operating in a continuous current mode. The switching power converter converts power from input power to output power. The switching power converter includes a main switch connected to a main inductor, wherein an auxiliary inductor is connectible with the main inductor. The main current flows from an input to an output. The auxiliary inductor is connected with the main inductor thereby charging the auxiliary inductor so that an auxiliary current flows from the output to the input opposing the main current. Upon a total current including a sum of the main current and the auxiliary current. substantially equals or approaches zero, the switch is turned on.

17 Claims, 13 Drawing Sheets

$Q_1$ on, $Q_2$ off, $Q_3$ on, $Q_4$ off (Buck Phase)

$Q_1$ off, $Q_2$ on, $Q_3$ off, $Q_4$ on (Boost phase)

ZERO CURRENT SWITCHING

CROSS REFERENCE TO RELATED APPLICATIONS

The present application benefits from U.S. provisional application 61/039,046 filed on Mar. 24, 2008 by the present inventors.

BACKGROUND

1. Technical Field

The present invention relates to switching converters and to specifically a method and devices for zero current switching for reducing switching losses in switching converters.

2. Description of Related Art

FIG. 1 shows a typical conventional buck-boost DC-to-DC converter circuit 10. The buck circuit of buck-boost DC-to-DC converter 10 has an input voltage $V_{in}$ with an input capacitor $C_1$ connected in parallel across $V_{in}$. Two switches are implemented as field effect transistors (FET) with integral diodes: a high side buck switch $Q_1$ and a low side buck switch $Q_2$ connected in series by connecting the source of $Q_1$ to the drain of $Q_2$. The drain of $Q_1$ and the source of $Q_2$ are connected parallel across an input capacitor $C_1$. A node A is formed between switches $Q_1$ and $Q_2$ to which one end of an inductor 106 is connected. The other end of inductor 106 is connected to the boost circuit of buck-boost DC-to-DC converter 10 at a node B. Node B connects two switches: a high side boost switch $Q_4$ and a low side boost switch $Q_3$ together in series where the source of $Q_4$ connects to the drain of $Q_3$ to form node B. The drain of $Q_4$ and the source of $Q_3$ connect across an output capacitor $C_2$ to produce the output voltage $V_{out}$ of buck-boost DC-to-DC converter 10.

FIG. 2a illustrates the buck phase or on-state circuit of DC-to-DC converter circuit 10 shown in FIG. 1, the input voltage source $V_{in}$ is directly connected to inductor 106 and the load is isolated from $V_{in}$ because $Q_1$ is on, $Q_2$ is off, $Q_3$ is on and $Q_4$ is off. These switch positions: $Q_1$ on, $Q_2$ off, $Q_3$ on and $Q_4$ off; result in accumulating energy in inductor 106 since source $V_{in}$ is directly connected to inductor 106. In the on-state, output capacitor $C_2$ supplies energy to the load.

FIG. 2b illustrates the boost phase or off-state circuit of DC-to-DC converter circuit 10, Inductor 106 is connected in parallel across the load and capacitor $C_2$ because $Q_1$ is off, $Q_2$ is on, $Q_3$ is off and $Q_4$ is on. $Q_1$ being off isolates inductor 106 from the input voltage ($V_{in}$) and capacitor ($C_1$). The stored energy in inductor 106 (as a result of the previous On-state) is transferred from inductor 106 to $C_2$ and the load.

Two common methods of operating DC-to-DC converter circuit 10 are in either continuous mode or discontinuous mode. If the current through the inductor 106 never falls to zero during a commutation cycle (i.e. the time period to perform both the on-state and the off-state), DC-to-DC converter circuit 10 is said to operate in continuous mode and typically the on-state operates for a shorter period of time when compared to the off-state. Discontinuous mode of operation for DC to DC converter circuit 10 occurs when the amount of energy required by the load is small enough to be transferred in a time period smaller than the whole commutation cycle. Typically, the current through inductor 106 falls to zero for a short time period after the off-state period and therefore inductor 106 is completely discharged at the end of the commutation cycle. The commutation cycle therefore includes the on-state, the off-state and the short time period during which the inductor current is zero.

A conventional "resonant" method for achieving virtually zero power loss when switching a switch is to apply a direct current voltage input voltage $V_{in}$ across a switch (with a diode connected across the switch, the diode is reverse biased with respect to $V_{in}$) in series with an inductor L and a capacitor C. The output voltage of the circuit is derived across the capacitor. The output voltage of the circuit could then in principle be connected to the input of a power converter, for example a buck-loaded series tank circuit with load. The resonant frequency of the series inductor L and capacitor C is given by Eq. 1 and the corresponding resonant periodic time T given in Eq. 2.

$$f_0 = 1/2\pi(LC)^{1/2} \qquad \text{Eq.1}$$

$$T = 1/f_0 \qquad \text{Eq.2}$$

A pulse response of the circuit means that when the switch turns on, there is both zero current in the inductor and zero voltage across the capacitor (Power=Volts×Current=0× 0=zero power loss at turn on). During steady state operation of the circuit, the inductor current and capacitor voltage are sinusoidal and have a 90 degrees phase shift with respect to each other. When the switch turns off (the on period of the switch corresponds to half of the resonant periodic time) there is zero current in the inductor and maximum positive voltage (i.e. $V_{capacitor} = V_{in}$) across the capacitor (Power=Volts× Current=$V_{in}$×0=zero power loss at turn off).

BRIEF SUMMARY

According to the present invention there is provided a method for providing non-resonant zero-current switching in a switching power converter operating in a continuous current mode. The switching power converter converts power from input power to output power. The switching power converter includes a main switch connected to a main inductor, wherein an auxiliary inductor is connected in parallel with the main inductor. The main current flows from an input to an output. The auxiliary inductor is connected with the main inductor thereby charging the auxiliary inductor so that an auxiliary current flows from the output to the input opposing main current. Upon a total current including a sum of the main current and the auxiliary current. substantially equals or approaches zero, the main switch is turned on. When the auxiliary current is or approaches zero current the auxiliary inductor is disconnected from the main inductor.

According to the present invention there is provided a switching converter including a buck stage or a boost stage or a buck-boost stage including: a main switch connecting an input voltage terminal to a first node, a main inductor connected at one end to the first node and at the other end operatively connected at a second node to a voltage output; and an auxiliary inductor adapted for connecting in parallel with the main inductor between the first and second nodes. Upon connecting the auxiliary inductor with the main inductor, the auxiliary inductor is charged so that an auxiliary current flows from the second node to the first node opposing the main current flowing between the first and second nodes through the main inductor. The total current includes a sum of the main current and the auxiliary current. When the total current substantially equals or approaches zero. The main switch is switched on. Energy stored within the auxiliary inductor is substantially all available for converting to output power by the switching converter. The current of the auxiliary inductor is naturally discharged to the input and/or the output. When the auxiliary current approaches zero, the auxiliary inductor is disconnected from the main inductor. The switching converter may include a first auxiliary switch adapted for connecting the auxiliary inductor to the first node; a second auxiliary switch adapted for connecting the auxiliary inductor to the second node. A discharge diode for discharging the auxiliary inductor is connected between the auxiliary conductor and a second input voltage terminal or ground in case of reverse current in the auxiliary inductor due to reverse recovery charge of one of the auxiliary switches. The first and second auxiliary switches are typically implemented as field-effect transistors each with parasitic diodes, with the parasitic diodes connected in opposite directions. The main switch is usually any of a: silicon controlled rectifier (SCR), insulated gate bipolar junction transistor (IGBT), bipolar junction transistor (BJT), field effect transistor (FET), junction field effect transistor (JFET), switching diode, electrical relay, reed relay, solid state relay, insulated gate field effect transistor (IGFET), diode for alternating current (DIAC), and/or triode for alternating current TRIAC.

According to the present invention there is provided a plurality of main switches interconnected in a bidirectional current full bridge topology, the main switches including a first switch, a second switch, a third switch and a fourth switch. A pair of input voltage terminals are attachable at a first node connecting the first and third switches and at a second node connecting the second and fourth switches. A first output voltage terminal is operatively attached at a third node connecting the third and fourth switches and a second output voltage terminal is operatively attached at a fourth node connecting the first and second switches. A first main inductor or a single inductor and some other circuitry (a transformer for example) first node is attachable between the first output voltage terminal and the third node and a second main inductor or a single inductor and some other circuitry second node attachable between the second output voltage terminal and the fourth node. An auxiliary inductor is connectible between the third node and the fourth node. Upon connecting the auxiliary inductor with the first and/or second main inductors or single inductor with circuitry, the auxiliary inductor is charged so that an auxiliary current flows between the third node and the fourth node. The auxiliary current opposes the main current. The total current includes a sum of the main current and the auxiliary current.

When the total current substantially equals or approaches zero, the main switches are switched (on). The current of the auxiliary inductor is naturally discharged to the input and/or the output. When the auxiliary current approaches zero, the auxiliary inductor is disconnected from the main circuit. Energy stored within the auxiliary inductor is substantially all available for converting to output power by the switching converter. A first auxiliary switch is preferably adapted for connecting the auxiliary inductor to the third node and a second auxiliary switch is adapted for connecting the auxiliary inductor to the fourth node. One or two discharge diodes are preferably connected between said auxiliary conductor to the second node. The discharge diodes serve to protect against reverse recovery current of the auxiliary switches, depending on the main current direction. The first and second auxiliary switches are typically implemented as field-effect transistors each with parasitic diodes; the parasitic diodes are connected on opposite directions. The first inductor and the second inductor are preferably split inductors. The main switches are silicon controlled rectifier (SCR), insulated gate bipolar junction transistor (IGBT), bipolar junction transistor (BJT), field effect transistor (FET), junction field effect transistor (JFET), switching diode, electrical relay, reed relay, solid state relay, insulated gate field effect transistor (IGFET), diode for alternating current (DIAC), and/or triode for alternating current TRIAC.

BRIEF DESCRIPTION OF THE DRAWINGS

The invention is herein described, by way of example only, with reference to the accompanying drawings, wherein.

Figure 1:
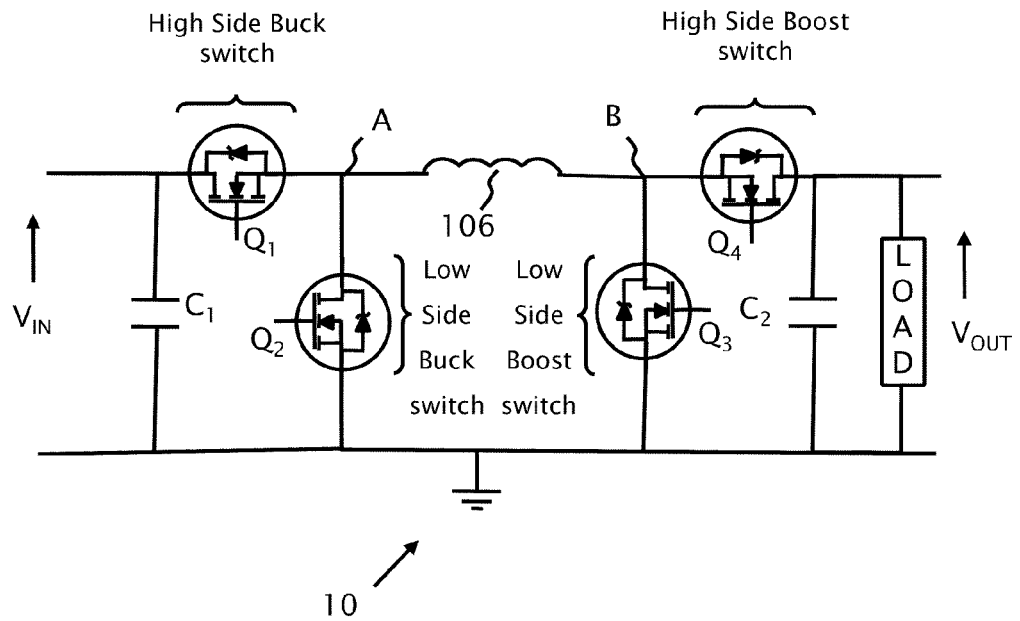
FIG. 1 shows a typical conventional buck-boost DC-to-DC converter circuit.
Figure 2A:
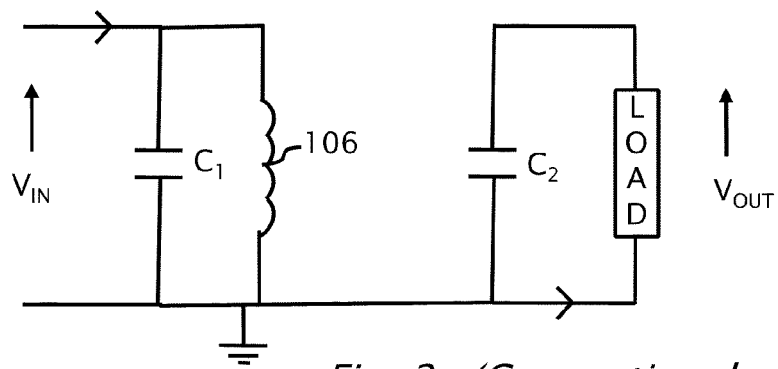
FIG. 2a illustrates the buck phase or on-state circuit of conventional DC-to-DC converter circuit.
Figure 2B:
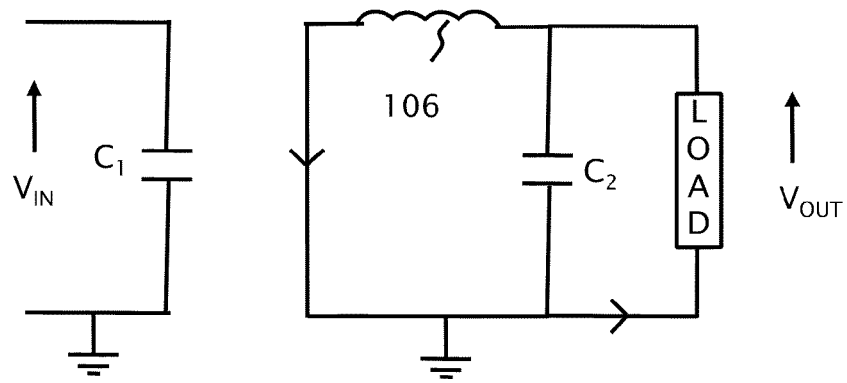
FIG. 2b illustrates the boost phase or off-state circuit of DC-to-DC converter circuit.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

DEFINITIONS

The term switch as used herein refers to any of: silicon controlled rectifier (SCR), insulated gate bipolar junction transistor (IGBT), bipolar junction transistor (BJT), field effect transistor (FET), junction field effect transistor (JFET), switching diode, mechanically operated single pole double pole switch (SPDT), SPDT electrical relay, SPDT reed relay, SPDT solid state relay, insulated gate field effect transistor (IGFET), diode for alternating current (DIAC), and triode for alternating current (TRIAC).

The term "zero current switching" (or "ZCS") as used herein is when the current through a switch is reduced to significantly zero amperes prior to when the switch is being turned either on or off.

The term "power converter" as used herein applies to DC-to-DC converters, AC-to-DC converters, DC-to-AC inverters, buck converters, boost converters, buck-boost converters, full-bridge converters and half-bridge converters or any other type of electrical power conversion/inversion known in the art.

The term "zero voltage switching" (or "ZVS") as used herein is that the peak voltage across a switch, is reduced to substantially zero volts when the switch is being turned either on or off.

The term "cycle" or "commutation cycle" refers to the periodicity of main switch positions in a circuit which performs a process of electrical power conversion or inversion.

The term "non-resonant" as used herein to exclude resonant and quasi-resonant circuits used in the prior art for zero current switching. Resonant switching implies that the switching frequencies are similar to a resonant frequency of a resonant tank circuit in the switching converter.

The terms "charging" and "discharging" in the context of the present invention in reference to charging and discharging a capacitor, are used herein interchangeably except that current flow while charging and discharging is usually in the opposite direction.

Figure 3:
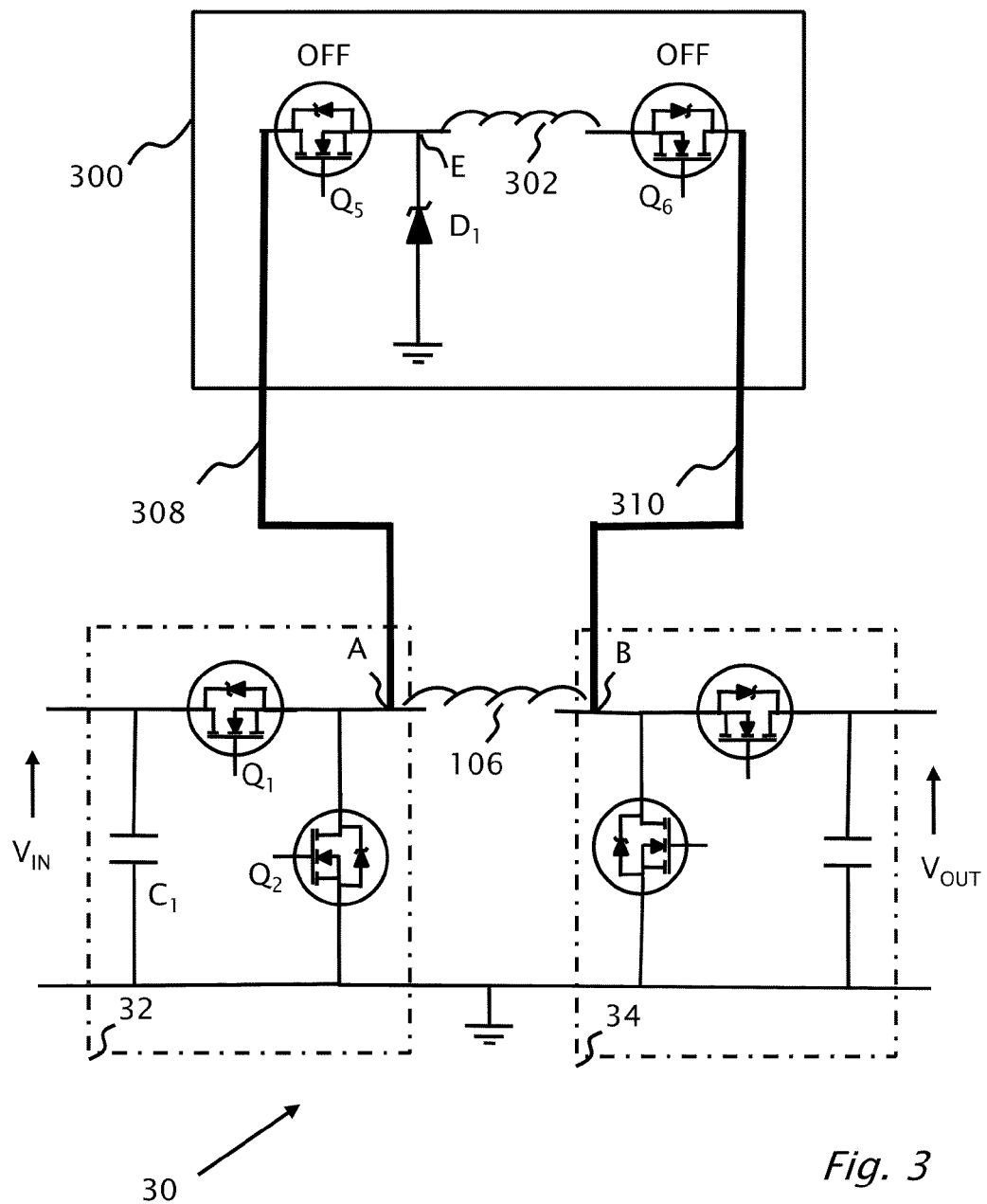
FIG. 3 illustrates a buck-boost DC-to-DC converter, according to an embodiment of the present invention.

Reference is now made to FIG. 3 (including FIGS. 3a-3e) showing a buck-boost DC-to-DC converter 30 according to an embodiment of the present invention. A buck circuit 32 of buck-boost DC-to-DC converter 30 has an input voltage $V_{in}$ with an input capacitor $C_1$ connected in parallel across $V_{in}$. Two switches $Q_1$ and $Q_2$ are connected in series at node A by connecting the source of $Q_1$ to the drain of $Q_2$. The drain of $Q_1$ and the source of $Q_2$ are placed in parallel across capacitor $C_1$. The source of $Q_2$ is connected to ground. The other end of inductor 106 is connected in the present example to a boost circuit 34 of buck boost DC-to-DC converter 30 at node B.

A zero-voltage switching feature according to embodiments of the present invention is provided using switch module 300. Switch module 300 has a switch $Q_5$, the drain of $Q_5$ is connected to node A of buck circuit 32 via link 308. The source of $Q_5$ connects to one end of an auxiliary inductor 302 to form a node E. A cathode of discharge diode $D_1$ connects to node E and the anode of discharge $D_1$ connects to ground. The other end of auxiliary inductor 302 connects to the source of switch $Q_6$. The drain of $Q_6$ connects to node B of boost circuit 34 via a link 310.

Figure 3A:
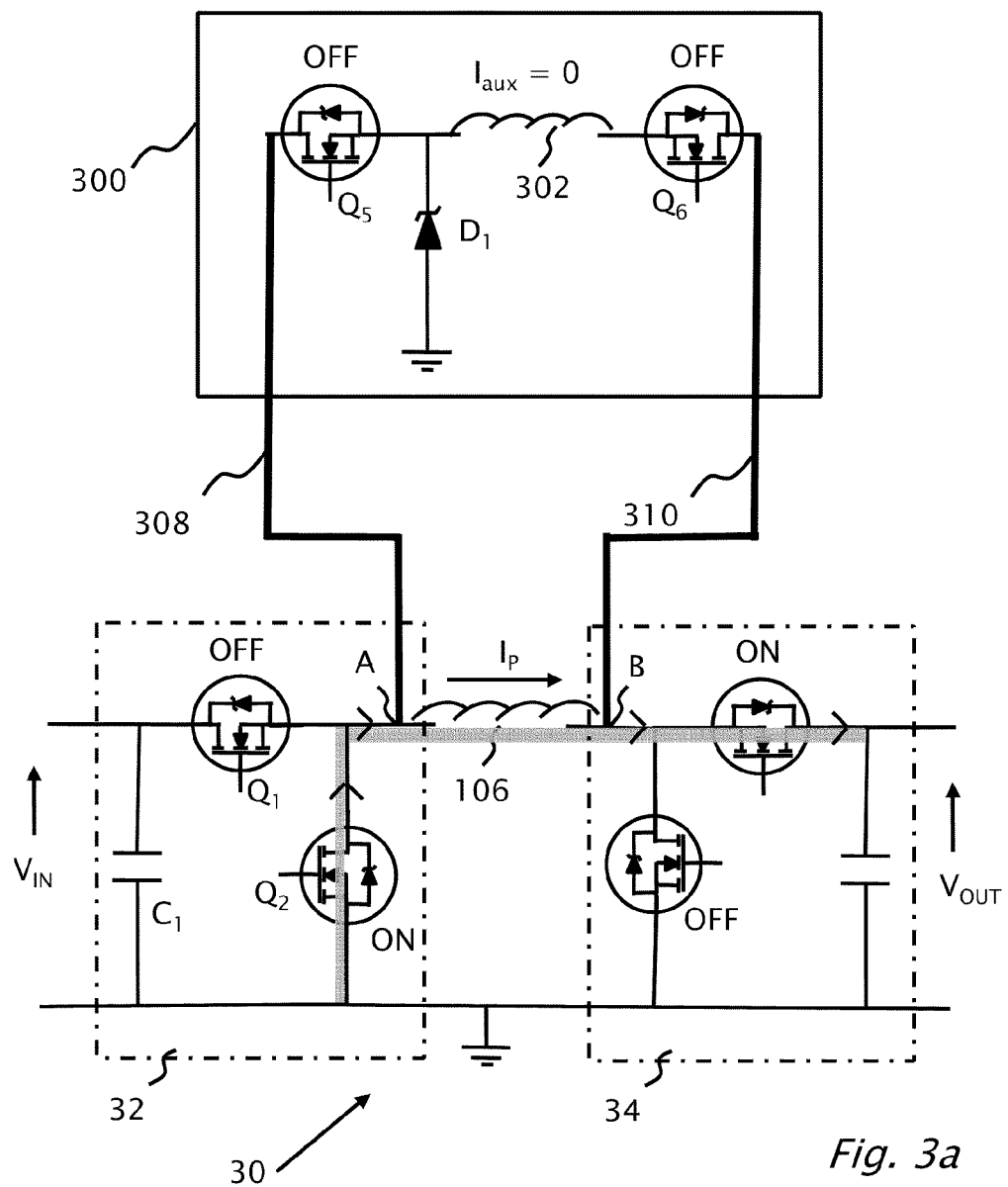
FIGS. 3a-3e illustrate operation of the buck-boost DC-to-DC converter, according to the embodiment of FIG. 3.
Figure 3B:
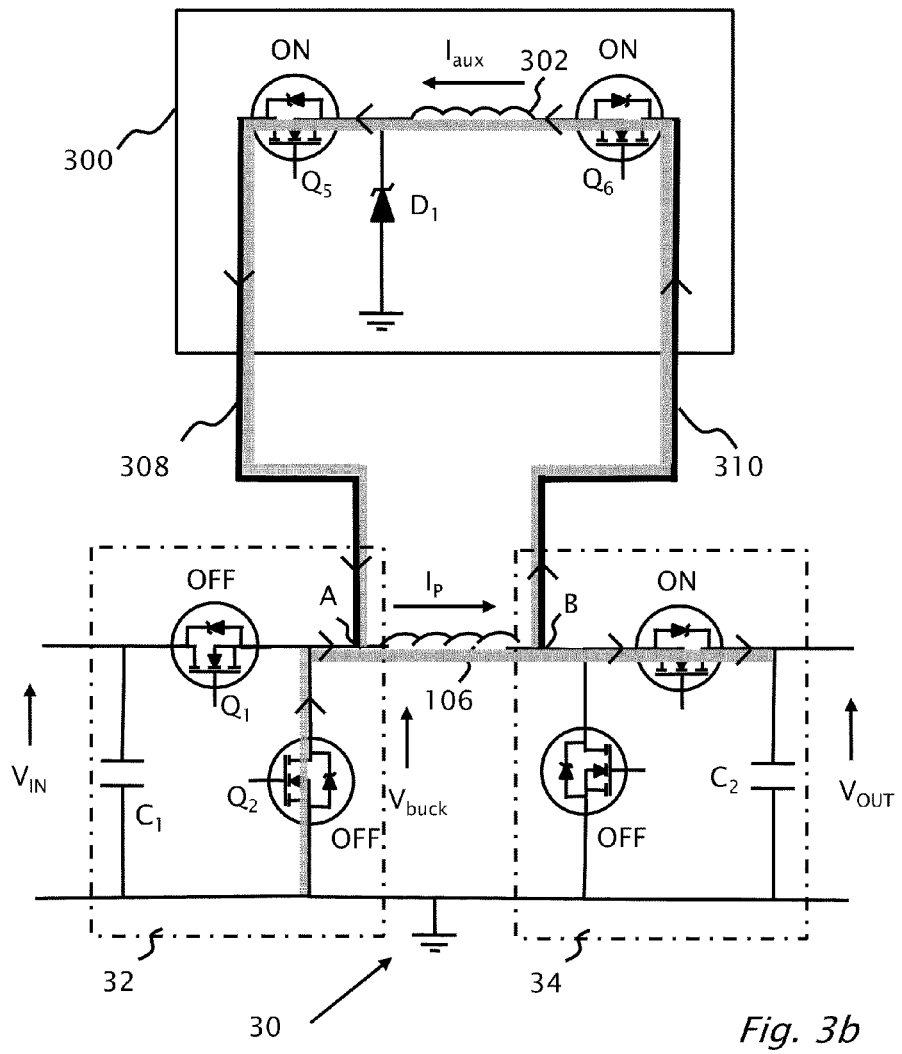
Figure 3C:
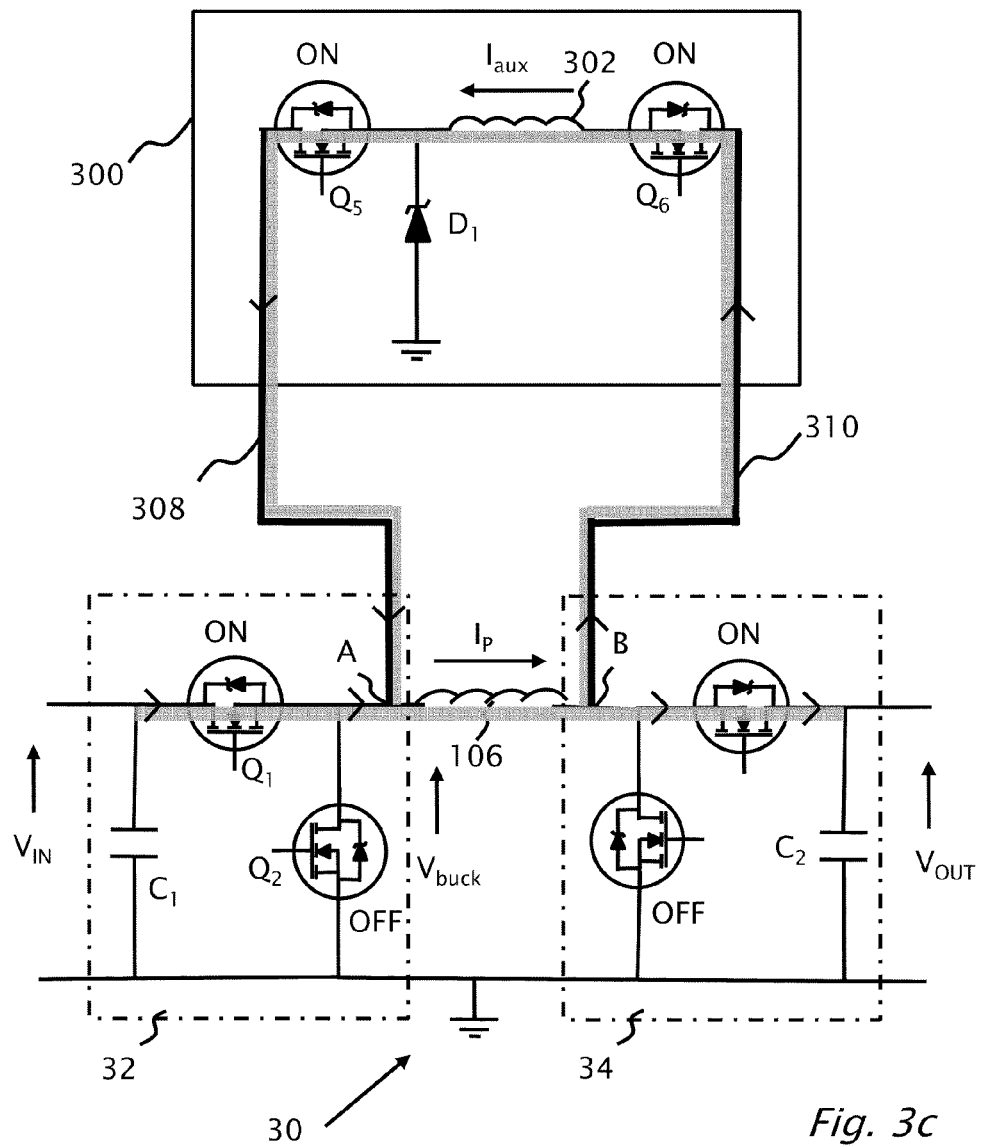
Figure 3D:
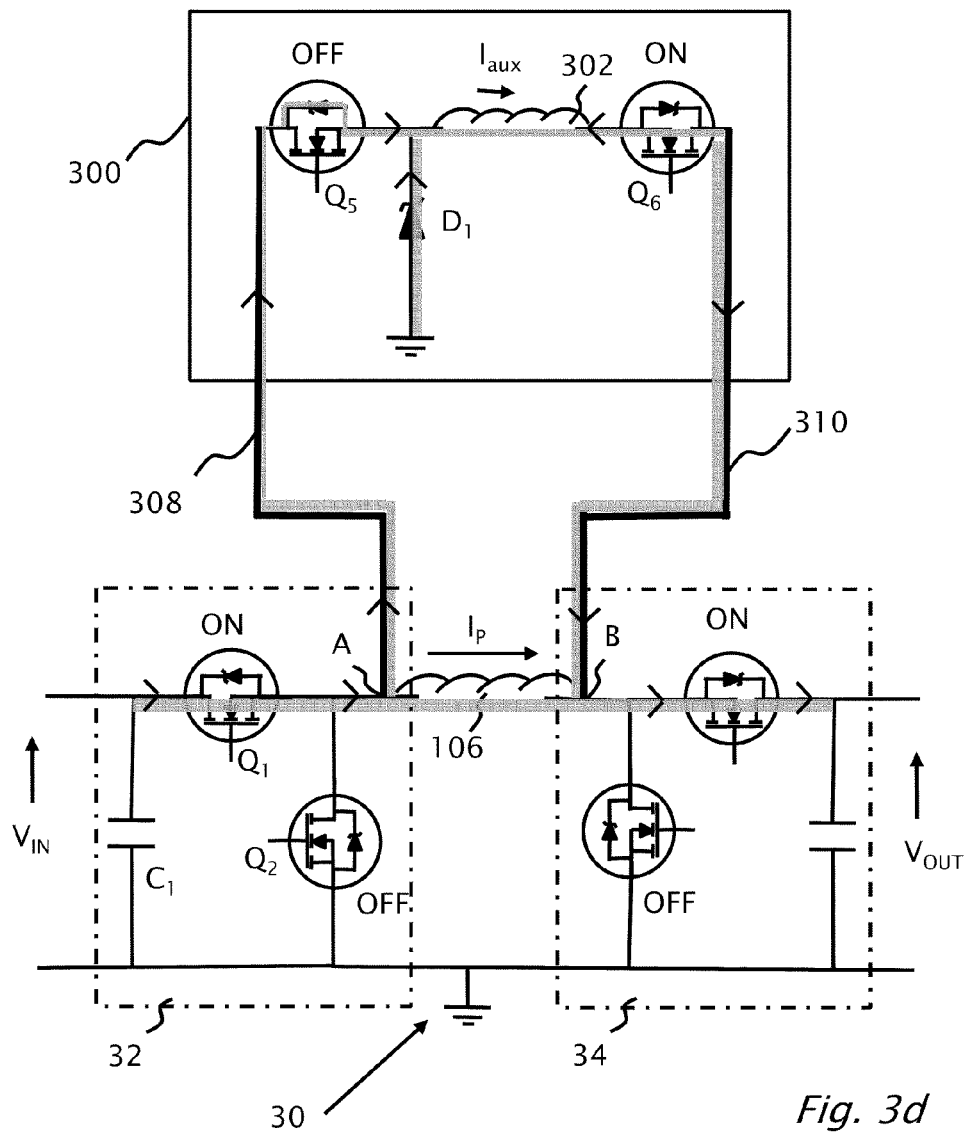
Figure 3E:
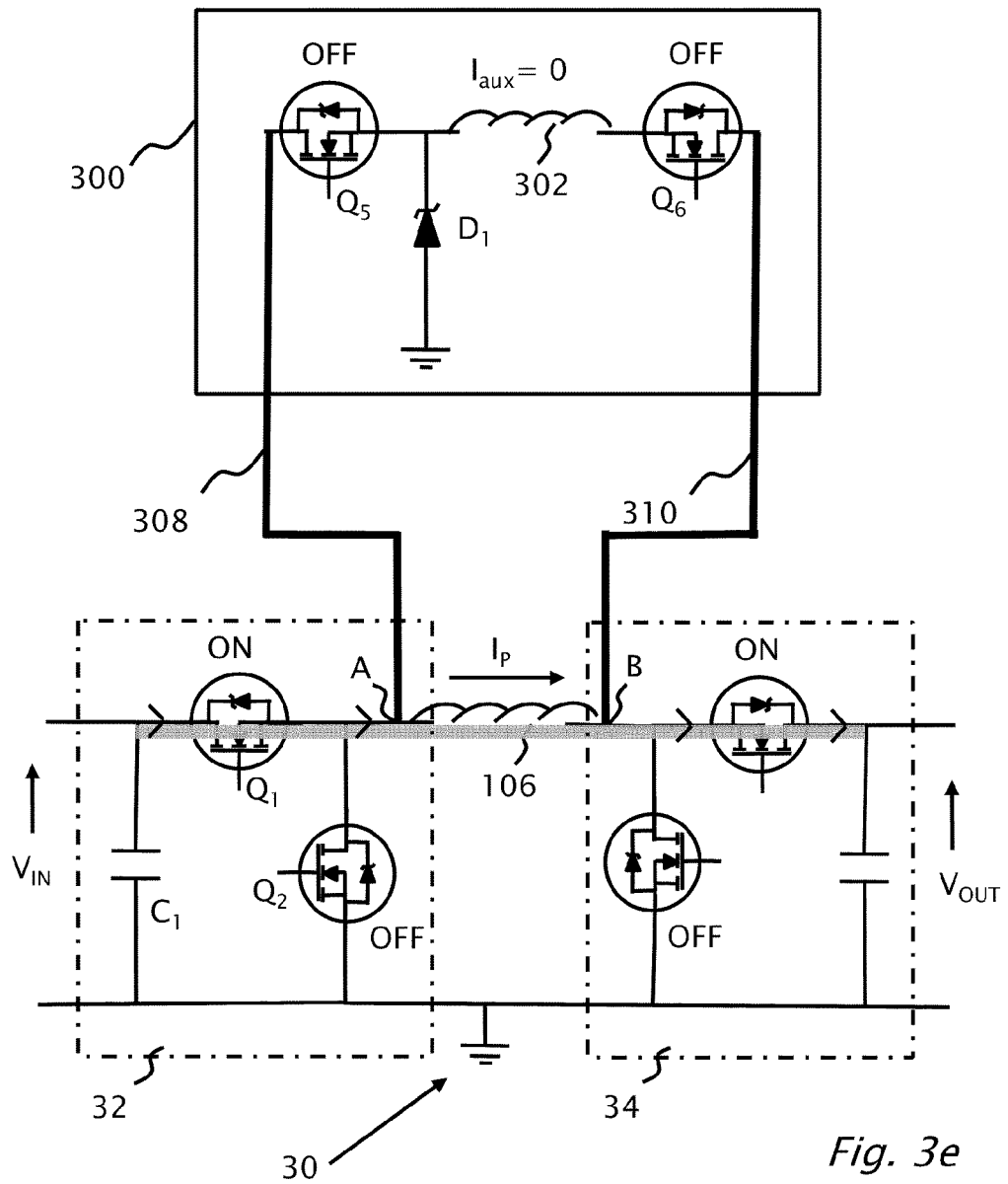
Figure 4:
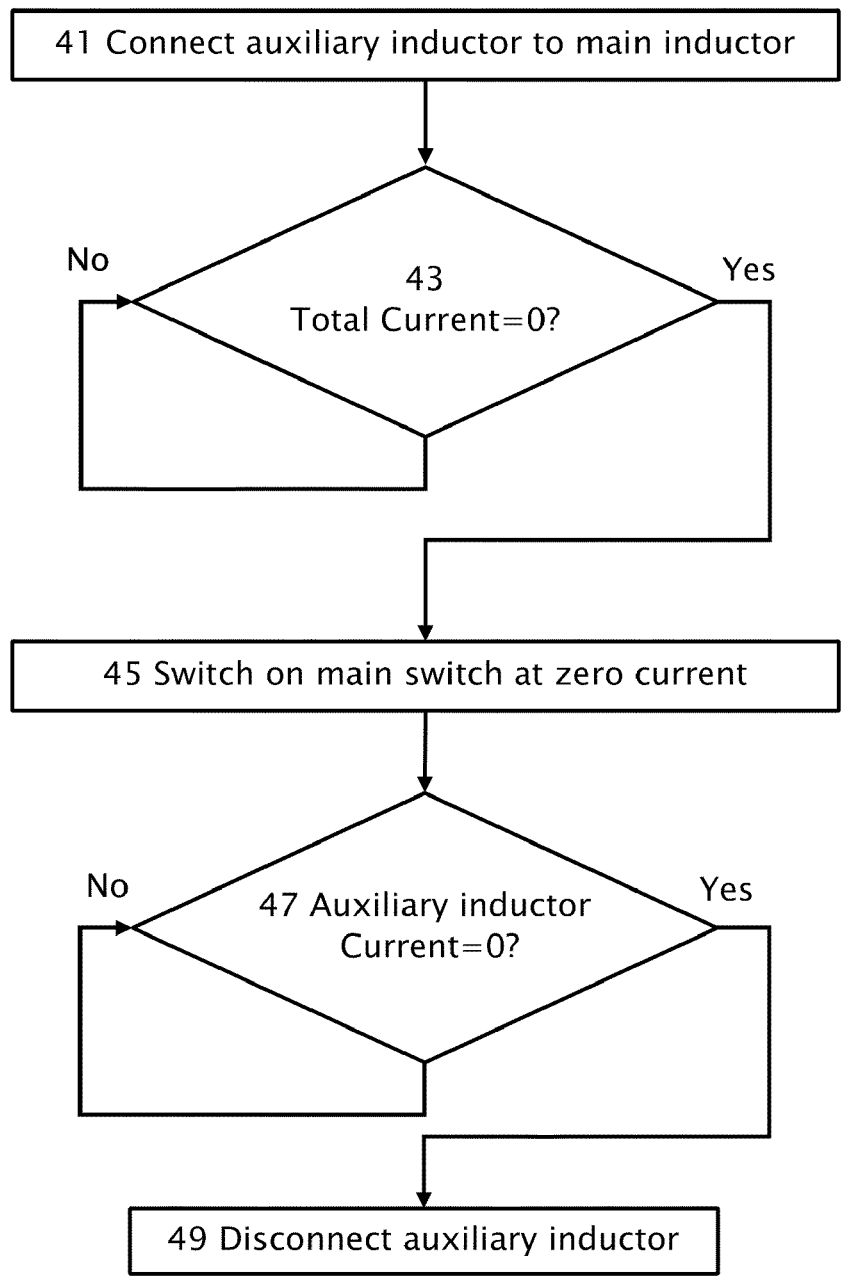
FIG. 4 shows a flow diagram of a method for zero current switching, running in continuous mode during the turn on of a main switch according to embodiments of the present invention.

Reference is still made to buck-boost DC-to-DC converter 30 shown in FIGS. 3a-3e which illustrate operation of buck-boost DC-to-DC converter 30 and FIG. 4 showing a flow diagram of a method for zero current switching, for zero current switching in boost and/or buck topologies running in continuous mode during the turn on of main switch $Q_3$ and/or $Q_1$ according to embodiments of the present invention. Throughout the following illustration using FIGS. 3a-3e, an electrical property of an inductor is relied upon; namely that when a voltage V is applied across an inductor, the initial current through the inductor is zero and after a certain time period inductor current $I_L$ builds up linearly. In FIGS. 3a-3e, current flow in buck circuit 32, boost circuit 34 and switch module 300 is indicated by arrow markings and gray shaded lines.

A. Reference is now made to FIG. 3a which illustrates the state of DC-to-DC converter 30 prior to buck turn on. Switch $Q_2$ is on. Switches $Q_1$, $Q_5$ and $Q_6$ are off. Current flows through inductor 106 from node A to node B and switch $Q_2$. Switch $Q_2$ turns off and current continues to flow through the parasitic diode of switch $Q_2$.

B. Reference is now made to FIG. 3b which continuous to illustrate the state of DC-to-DC converter 30 prior to buck leg turn on. Switches $Q_5$ and $Q_6$ turn on at zero current at $I_{aux}$. Current $I_{aux}$ through auxiliary conductor and switches $Q_5$ and $Q_6$ increases linearly as auxiliary inductor 302 is charged by output voltage $V_{out}$. The direction of current $I_{aux}$ opposes current $I_p$ through main inductor 106 and flows from node B to node A. Switches $Q_1$, and $Q_2$, are off but current $I_p$ flows through inductor 106 from node A to node B through the parasitic diode of switch $Q_2$.

C. Reference is now made to FIG. 3c which illustrates the state of DC-to-DC converter 30 as buck legs turns on. When current $I_{aux}$ equals current $I_p$ through inductor 106 plus $Q_2$ diode recovery current, the voltage $V_{buck}$ across $Q_2$ starts to rise. Switch $Q_1$ then turns on at zero current. Switch $Q_2$ remains off. Switches $Q_5$ and $Q_6$ remain on and $I_{aux}$ begins to decrease discharging from $V_{in}$ to $V_{out}$.

D. Reference is now made to FIG. 3d which continues to illustrate the state of DC-to-DC converter 30 as buck leg turns on; $Q_5$ turns off when current through $I_{aux}$ gets low (i.e. substantially zero current switching), the current $I_{aux}$ flows through $Q_5$ parasitic diode. The current $I_{aux}$ reverses because of $Q_5$ reverse recovery current. This reverse recovery current discharges through the discharge diode $D_1$ and $Q_6$.

E. Reference is now made to FIG. 3e which illustrates the state of DC-to-DC converter 30 after buck leg turns on. Current $I_p$ flows through switch $Q_1$ through inductor 106 and through boost circuit 34. Current $I_{aux}$ falls to zero and switch $Q_6$ is turned off.

FIG. 4 shows a simplified flow diagram of a method for zero current switching according to an embodiment of the present invention. Still referring to the embodiment of FIG. 3, in step 41, auxiliary inductor 302 is connected to main inductor 106 in parallel by auxiliary switches $Q_5$ and $Q_6$. When the total current is substantially zero in decision box 43, main switch $Q_1$ is switched on (step 45) at zero current. A preferred method of determining when the total current reached is zero is to use a zero current sensing circuit or to turn $Q_1$ on at a time according to the timing transients of either auxiliary inductor 302 or inductor 106. When the current in auxiliary inductor 302 is substantially zero in decision box 47, auxiliary switch $Q_6$ is switched off (step 49) at zero current and inductor 302 is disconnected across inductor 106. A preferred method of determining when the current in auxiliary inductor 302 approaches zero current, is to use a zero current sensing circuit or to turn $Q_6$ off at a time according to the timing transients of either auxiliary inductor 302 or inductor 106.

Figure 5:
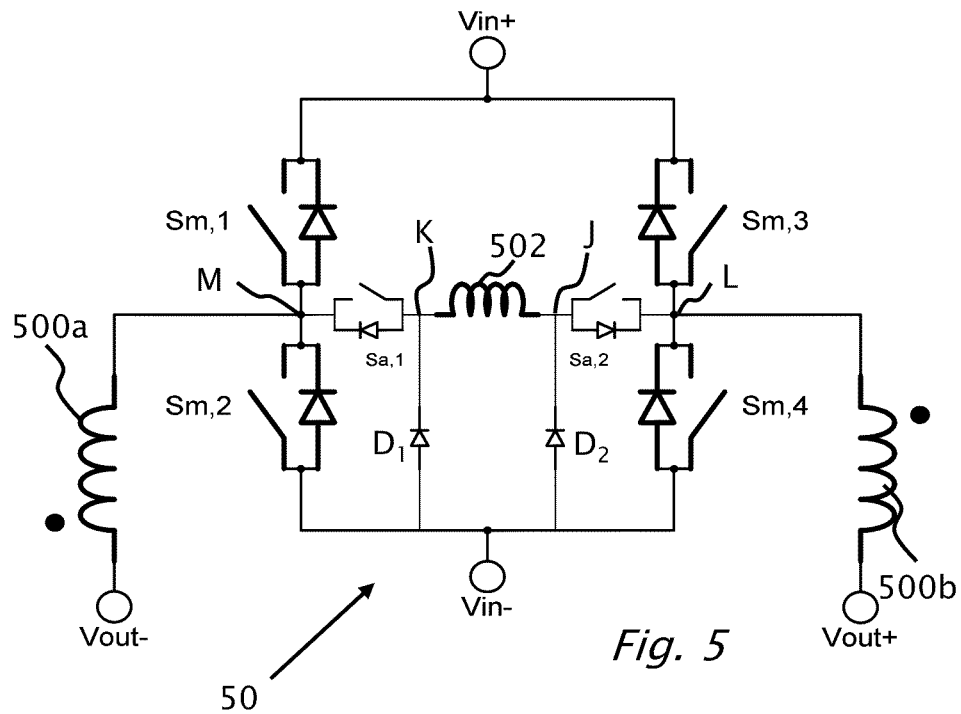
FIG. 5 shows another embodiment of present invention as applied to a full bridge switched DC-to-DC converter.

FIG. 5 shows a further embodiment of present invention as applied to a full bridge DC to DC converter 50. Full bridge DC to DC converter 50 has four main switches $S_{m,1}$, $S_{m,2}$, $S_{m,3}$ and $S_{m,4}$ connected together in a full bridge configuration. Each of four main switches ($S_{m,1}$, $S_{m,2}$, $S_{m,3}$ and $S_{m,4}$) have respective diode shunts connected in parallel thereto. The diodes placed across switches $S_{m,1}$ and $S_{m,2}$ are in both the same direction similarly the diodes of $S_{m,3}$ and $S_{m,4}$ are both in the same direction. All diodes connected across switches $S_{m,1}$, $S_{m,2}$, $S_{m,3}$ and $S_{m,4}$ are reverse biased with respect to the input voltage $V_{in}$. An input voltage ($V_{in}^-$) of full bridge DC-to-DC converter 50 is connected across the node between switches $S_{m,2}$ and $S_{m,4}$ and an input voltage ($V_{in}^+$) is connected at the node between switches $S_{m,1}$ and $S_{m,3}$. An output voltage ($V_{out}^-$) of full bridge DC-to-DC converter 50 is connected across the node (M) between switches $S_{m,1}$ and $S_{m,2}$ connected through a split inductor 500a and output voltage $V_{out}^+$ is connected at the node (L) between switches $S_{m,3}$ and $S_{m,4}$ through a split inductor 500b. An auxiliary switch $S_{a,1}$ is connected between nodes M and K. A diode is placed across in parallel with $S_{a,1}$ with the cathode of the diode connected to node M and the anode of the diode connected to node K. A discharge diode $D_1$ is connected between node K and $V_{in}^-$ with the anode of $D_1$ connected to $V_{in}^-$ and the cathode of $D_1$ connected to node K. One end of an auxiliary inductor 502 connects to node K. The other end of auxiliary inductor 502 connects to node J. A discharge diode $D_2$ is connected between node J and $V_{in}^-$ with the anode of $D_2$ connected to $V_{in}^-$ and the cathode of $D_2$ connected to node J. An auxiliary switch $S_{a,2}$ is connected between nodes J and L. A diode is placed across in parallel with $S_{a,2}$ with the cathode of the diode connected to node L and the anode of the diode connected to node J.

The operation of full bridge circuit 50, according to a feature of the present invention is illustrated with reference also to FIGS. 5a-5e and FIG. 6 which shows a timing diagram of selected voltages and currents for steps V to Z is as follows:

FIGS. 5a-5e illustrate current flow is indicated by arrow markings and gray shaded lines.

Figure 5A:
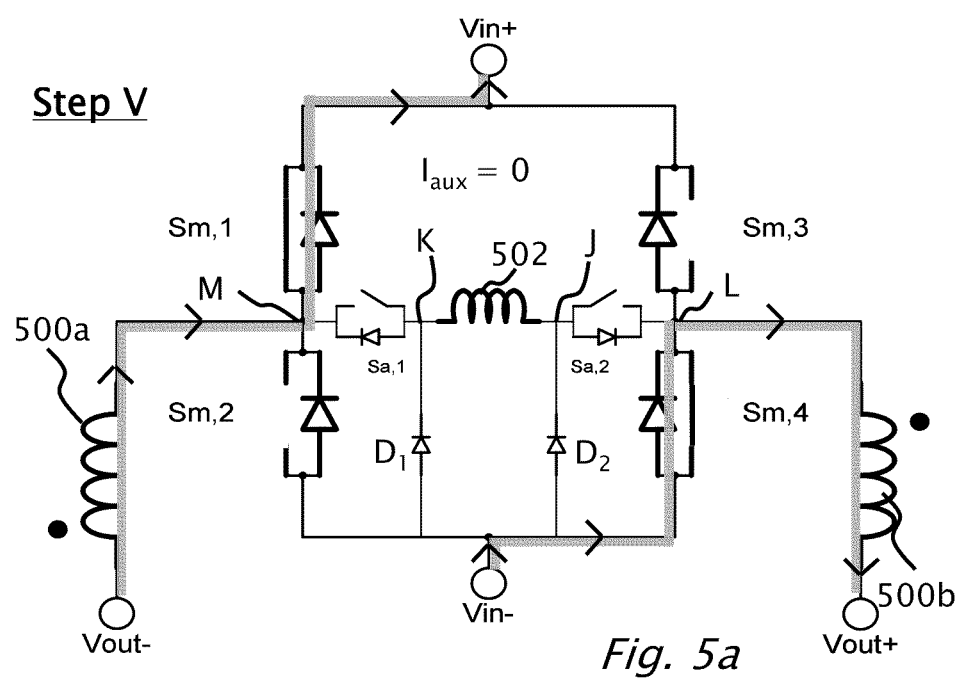
FIGS. 5a-5e illustration operation according to the embodiment of FIG. 5.

V) Referring now specifically to FIG. 5a: Main switches $S_{m,1}$ and $S_{m,4}$ are turned on, all other switches are off. Current $I_p$ flows from $V_{out}^-$ to $V_{in}^+$ through inductor 500a, and through main switch $S_{m,1}$. Current flows from $V_{in}^-$ to $V_{out}^+$ through main switch $S_{m,4}$ and through inductor 500b.

Figure 5B:
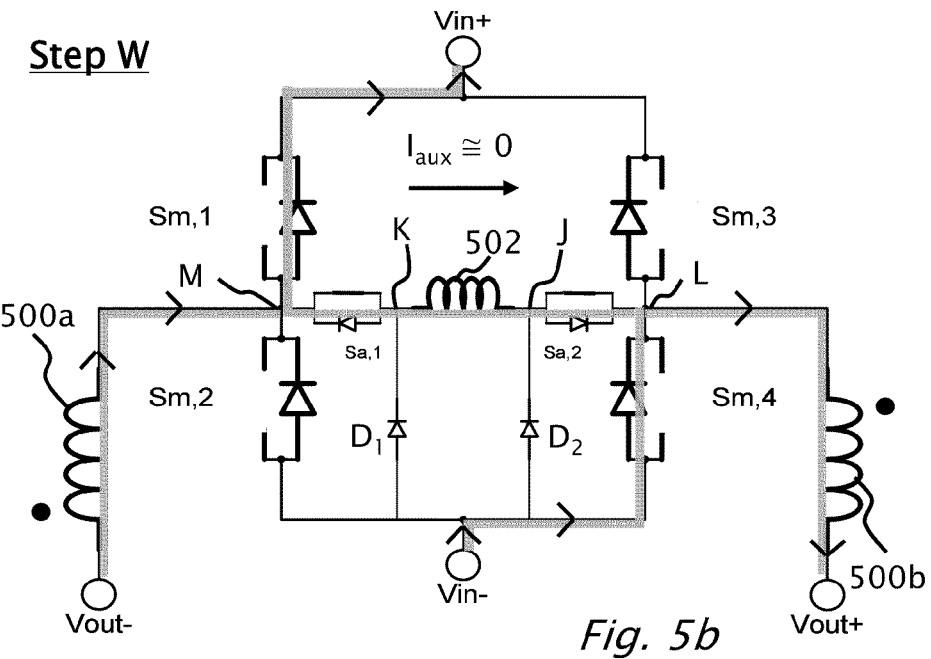

W) Referring now specifically to FIG. 5b; Switches $S_{m,1}$ and $S_{m,4}$ are turned off. Switches $S_{a,1}$ and $S_{a,2}$ are turned on. Current $I_{aux}$ begins at zero current and increases linearly, current $I_{aux}$ flowing between nodes M and L. Because the current $I_{aux}$ is initially zero, the switching on of switches $S_{a,1}$ and $S_{a,2}$, occurs with zero current. Current flows from $V_{out}^-$ to $V_{in}^+$ through inductor 500a, and through the diode of main switch $S_{m,1}$ Current flows from $V_{in}^-$ to $V_{out}^+$ through the diode of main switch $S_{m,4}$ and through inductor 500b.

Figure 5C:
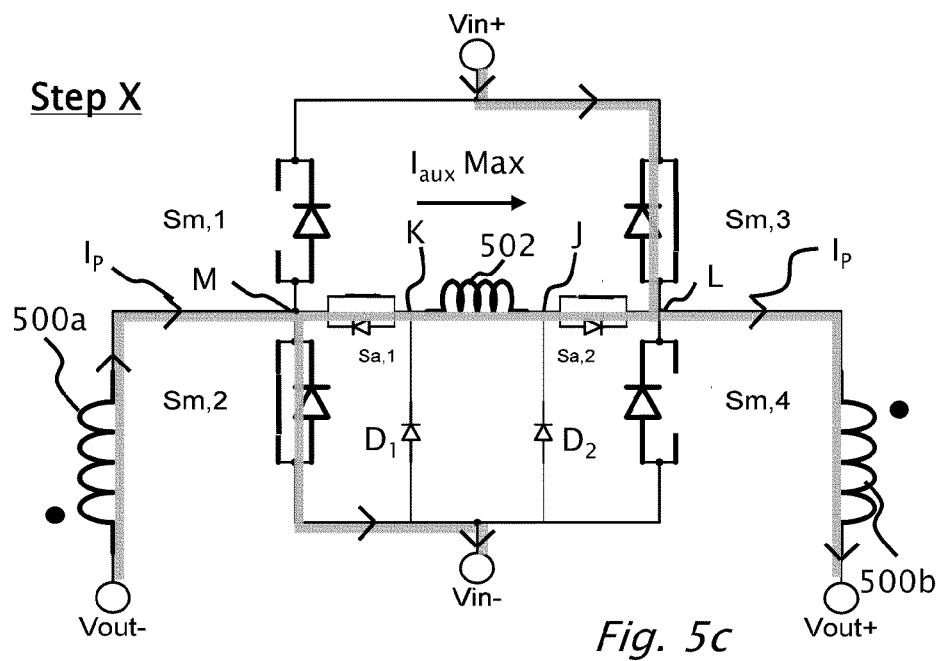

X) Referring now specifically to FIG. 5c; Once the auxiliary current $I_{aux}$ reaches a peak value, equaling to $I_p$, main switches $S_{m,2}$ and $S_{m,3}$ are turned on with zero current since Kirchhoff's current equation at node M shows current through main switch $S_{m,2}$: $IS_{m,2}=I_P-I_{aux}=0$ and Kirchhoff's current equation at node L shows $IS_{m,3}=I_P-I_{aux}=0$. Current flows from $V_{in}^+$ to $V_{out}^+$ through main switch $S_{m,3}$, and through inductor 500b. Current now flows from $V_{out}^-$ to $V_{in}^-$ through inductor 500a and through main switch $S_{m,2}$.

Figure 5D:
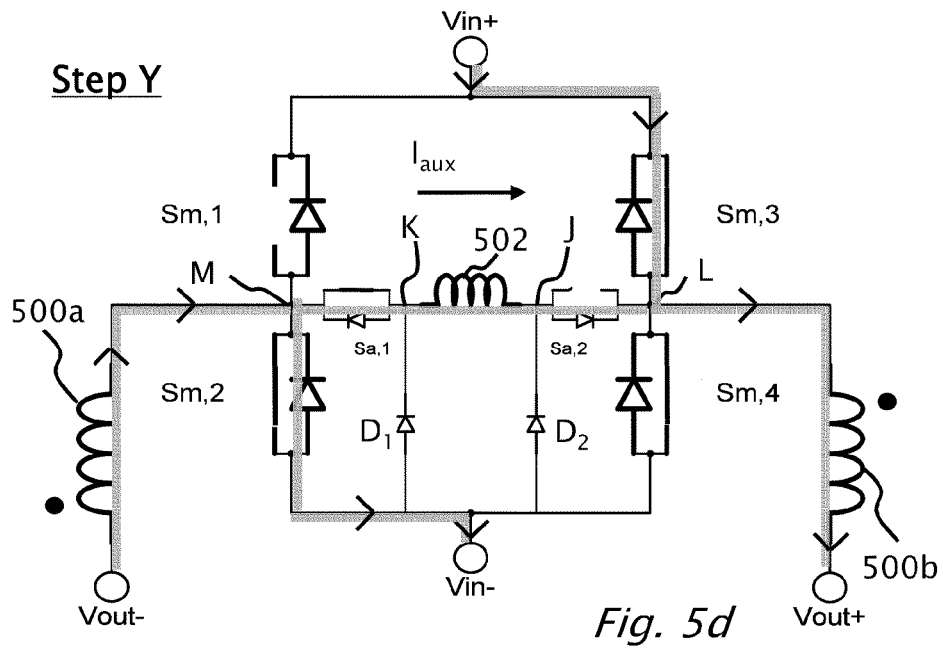

Y) Referring now specifically to FIG. 5d; Auxiliary switch $S_{a,2}$ is now turned off as current $I_{aux}$ has reduced to substantially zero in the direction of node M to node L. Diode $D_2$ takes any reverse recovery current from switch $S_{a,2}$. Current flows into $V_{out}+$ from $V_{in}^+$ through inductor 500b, and through main switch $S_{m,3}$ Current now flows into $V_{in}^-$ from $V_{out}^-$ through main switch $S_{m,2}$ and through inductor 500a.

Figure 5E:
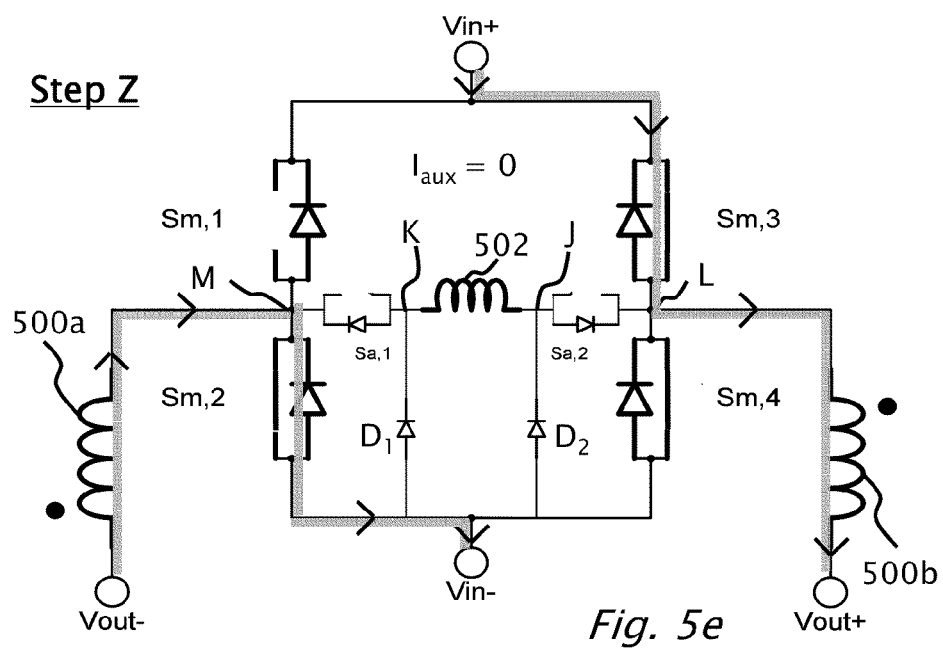
Figure 6:
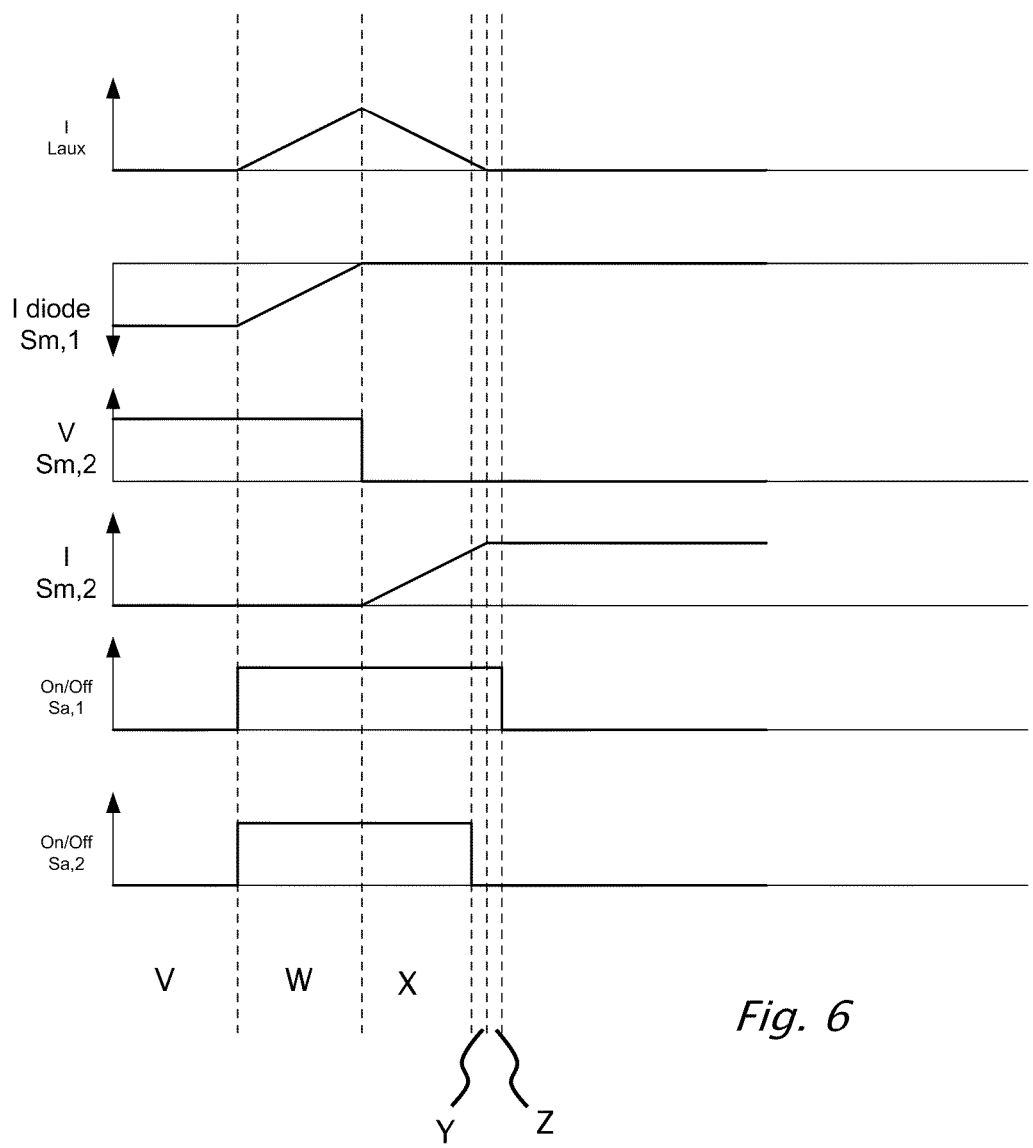
FIG. 6 shows a timing diagram of selected voltages and currents in the embodiment of the present invention according to FIG. 5.

Z) Referring now specifically to FIG. 5e; Auxiliary switch $S_{a,1}$ is now turned off with zero current $I_{aux}$. Current flows into $V_{out}+$ from $V_{in}^+$ through inductor 500b, and through main switch $S_{m,3}$ Current now flows into $V_{in}^-$ from $V_{out}^-$ to through main switch $S_{m,2}$ and through inductor 500a.

Similar switching steps occur when the current at the main inductor 500 is reverse in polarity. Switch pairs ($S_{m,1}$, $S_{m,2}$), ($S_{m,4}$, $S_{m,3}$), ($S_{a,1}$, $S_{a,2}$) and diodes ($D_2$, $D_1$) are swapped at the above description to accomplish this symmetrical case.

The definite articles "a", "an" is used herein, such as "a converter", "a switch" have the meaning of "one or more" that is "one or more converters" or "one or more switches".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A method for providing non-resonant zero-current switching in a switching power converter operating in a continuous current mode, said switching power converter converting power from input power to output power, said switching power converter including a main switch connected to at least one main inductor, wherein an auxiliary inductor is connectible with the main inductor, wherein main current flows from an input to an output, the method comprising the steps of:

directly connecting, in parallel, the auxiliary inductor with the main inductor thereby charging the auxiliary inductor so that an auxiliary current flows from the output to the input opposing said main current, the direct connecting avoiding the input, the output, and ground; and upon a total current substantially equaling zero, switching on the main switch, wherein said total current includes a sum of said main current and said auxiliary current.

2. The method according to claim 1, further comprising the step of:

disconnecting the auxiliary inductor from the main inductor when said auxiliary current is substantially or approaching zero current.

3. A switching converter including at least one stage selected from the group consisting of a buck stage and a boost stage, said at least one stage comprising:

a main switch connecting an input voltage terminal to a first node;

a main inductor connected at one end to said first node and at the other end operatively connected at a second node to a voltage output; and an auxiliary inductor adapted for connecting directly in parallel with the main inductor between said first and second nodes, wherein the auxiliary inductor does not connect to the main inductor through any of the input voltage, the voltage output, or ground.

4. The switching converter of claim 3:

wherein, upon said connecting the auxiliary inductor with the main inductor, charging said auxiliary inductor so that an auxiliary current flows from the second node to the first node opposing main current flowing between said first and second nodes through said main inductor, wherein a total current includes a sum of said main current and said auxiliary current, and wherein, upon a total current substantially equaling zero, said main switch is switched on, and energy stored within the auxiliary inductor is substantially all available for converting to output power by the switching converter.

5. The switching converter according to claim 3, further comprising:

a first auxiliary switch adapted for connecting said auxiliary inductor to said first node; and a second auxiliary switch adapted for connecting said auxiliary inductor to said second node.

6. The switching converter according to claim 3, further comprising:

a discharge diode connecting said auxiliary inductor to a second input voltage terminal or ground.

7. The switching converter according to claim 5, wherein said first and second auxiliary switches are implemented as field-effect transistors each with parallel connected parasitic diodes, wherein the parasitic diodes are connected in opposite directions.

8. The switching converter according to claim 3, wherein said main switch is selected from the group consisting of: a silicon controlled rectifier (SCR), an insulated gate bipolar junction transistor (IGBT), a bipolar junction transistor (BJT), a field effect transistor (FET), a junction field effect transistor (JFET), a switching diode, an electrical relay, a reed relay, a solid state relay, an insulated gate field effect transistor (IGFET), a diode for alternating current (DIAC), and/or a triode for alternating current TRIAC.

9. A switching converter comprising:
a plurality of main switches interconnected in a full bridge topology, said main switches including a first switch, a second switch, a third switch and a fourth switch, wherein a pair of input voltage terminals are attachable at a first node connecting said first and third switches and at a second node connecting said second and fourth switches; wherein a first output voltage terminal is operatively attached at a third node connecting said third and fourth switches and a second output voltage terminal is operatively attached at a fourth node connecting said first and second switches;
a first main inductor attachable between said first output voltage terminal and said third node;
a second main inductor attachable between said second output voltage terminal and said fourth node; and
an auxiliary inductor connectible between said third node and said fourth node.

10. The switching converter according to claim 9,
wherein, upon connecting the auxiliary inductor with said at least one of said first and second main inductors thereby charging the auxiliary inductor so that an auxiliary current flows between said third node and said fourth node, said auxiliary current opposes said main current,
wherein a total current includes a sum of said main current and said auxiliary current, and
wherein said main switches are switched on when said total current substantially equals or approaches zero current, and energy stored within said auxiliary inductor is substantially all available for converting to output power by the switching converter.

11. The switching converter according to claim 9, further comprising:
a first auxiliary switch adapted for connecting said auxiliary inductor to said third node; and
a second auxiliary switch adapted for connecting said auxiliary inductor to said fourth node.

12. The switching converter according to claim 11, wherein said first and second auxiliary switches are implemented as field-effect transistors each with parasitic diodes, wherein said parasitic diodes are connected on opposite directions.

13. The switching converter according to claim 9, further comprising:
at least one discharge diode connecting said auxiliary conductor to said second node.

14. The switching converter according to claim 9, wherein said first inductor and said second inductor are split inductors.

15. The switching converter according to claim 9, wherein main switches are selected from the group consisting of: a silicon controlled rectifier (SCR), an insulated gate bipolar junction transistor (IGBT), a bipolar junction transistor (BJT), a field effect transistor (FET), a junction field effect transistor (JFET), a switching diode, an electrical relay, a reed relay, a solid state relay, an insulated gate field effect transistor (IGFET), a diode for alternating current (DIAC), and a triode for alternating current TRIAC.

16. The method according to claim 1, wherein the main inductor and the auxiliary inductor are not adapted for magnetic coupling.

17. The switching converter of claim 3, wherein the main inductor and the auxiliary inductor are not adapted for magnetic coupling.

* * * * *